Figure 1:
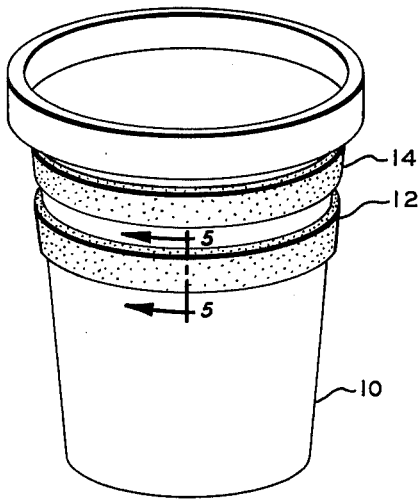

June 21, 1966  A. SCHECHTER  3,257,482
PROCESS FOR MAKING PLASTIC CONTAINER
Filed June 17, 1963  3 Sheets-Sheet 1

INVENTOR.
ALFRED SCHECHTER
BY Young & Quigg
ATTORNEYS

June 21, 1966  A. SCHECHTER  3,257,482
PROCESS FOR MAKING PLASTIC CONTAINER
Filed June 17, 1963  3 Sheets-Sheet 2

INVENTOR.
ALFRED SCHECHTER
BY Young & Quigg
ATTORNEYS

June 21, 1966  A. SCHECHTER  3,257,482
PROCESS FOR MAKING PLASTIC CONTAINER
Filed June 17, 1963  3 Sheets-Sheet 3

INVENTOR
ALFRED SCHECHTER
BY Young & Quigg
ATTORNEYS

United States Patent Office 3,257,482
Patented June 21, 1966

3,257,482
PROCESS FOR MAKING PLASTIC CONTAINER
Alfred Schechter, New Rochelle, N.Y., assignor to Phillips Petroleum Company, a corporation of Delaware
Filed June 17, 1963, Ser. No. 288,383
5 Claims. (Cl. 264—45)

This application is a continuation-in-part of my application, Serial No. 67,832, filed November 7, 1960, now U.S. Patent No. 3,126,139, issued March 24, 1964.

This invention relates to a process for making a partially insulated plastic container.

Plastic drinking cups formed of foamed resins or plastics to provide an insulated cup which is advantageous in handling hot liquids have come into wide use. In practice, such a cup has certain disadvantages when handling hot liquids, particularly, at temperatures of 160° or 170° F. up to the boiling point of the liquid. One of these disadvantages is the superb insulating quality of the foamed plastic which fails to allow the transmittal of enough heat thru the wall from the hot liquid to warn the drinker of the high temperature of the liquid. As a result, the drinker is burned when first drinking the liquid. In addition, the drinker appreciates some feeling of "hotness" when indulging in a hot drink and is deprived of this "feel" when drinking from foamed drinking cups such as foamed polystyrene.

This invention is concerned with a method of making an improved container or cup.

Accordingly, it is an object of the invention to provide a method for making a novel plastic container. Another object is to provide a method of making a partially insulated plastic cup which is more heat indicating to the hand than a foamed plastic cup. A further object is to provide a method of making a plastic cup of enhanced beauty. Other objects of the invention will become apparent upon consideration of the accompanying disclosure.

A broad aspect of the invention comprises forming a plastic unfoamed container for hot and cold liquids and heat sealing a strip of foamed plastic into the outside wall thereof to provide an insulating means for the hand of the user. The cup or container is formed of the unfoamed plastic in conventional manner as by vacuum forming, injection molding, or blow molding and the strip(s) of foamed plastic is welded to or fused into the wall of the container to provide an insulating means for the hand of the user.

In accordance with the invention, the partially insulated plastic cup is made by extruding a main melt of unfoamed plastic while simultaneously injecting into the side of the main melt, in a tubular extrusion, at least one minor stream of a plastic melt containing a foaming agent so that the foaming takes place during the extrusion of the tube or parison, thereby forming a longitudinal strip in the wall of the parison. The parison is then formed into a suitable container or cup by blow molding in conventional manner. By extruding several minor plastic melts containing a foaming agent at regular intervals around the tube before it passes thru the die, several longitudinal insulating strips are formed in the outer wall of the container.

The foamed strips can be of the same or of different color than the unfoamed cup. By applying strips of different color than the cup and by utilizing different colored strips, a desirable decorative effect is created which enhances the beauty of the cup.

The cup of the invention may be formed of any of the thermoplastic resins commonly utilized in the manufacture of such items. Such resins include polyolefins, polystyrene, vinyl resins, etc. The polyolefins applicable are those of the aliphatic mono-1-olefins such as ethylene, propylene, butene-1, hexene-1, and octene-1, and the like. Homopolymers of these 1-olefins having a maximum of 8 carbon atoms per molecule and no branching nearer the double bond than the 4-position provide excellent unfoamed polymers for the body of the cup. Also, copolymers of these 1-olefins with olefins containing up to 12 or more carbon atoms are suitable. Mixtures of homopolymers and copolymers are also suitable materials.

A preferred method of preparing polymers of aliphatic mono-1-olefins and, particularly, of ethylene, is described in detail in the U.S. patent of Hogan and Banks, 2,825,721, issued March 4, 1958. This particular method utilizes a chromium oxide catalyst, containing hexavalent chromium deposited on a support of silica, alumina, silica-alumina, zirconia, thoria, etc. In the method of this patent, olefins are polymerized in the presence of a hydrocarbon diluent, for example an acyclic alicyclic, or aromatic compound which is inert and in which the polymer is soluble. The reaction is carried out at a temperature between about 150° F. and about 450° F. and, usually, under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures in the range of about 150° to about 320° F. and a mobile catalyst are used for polymerization, the product polymer is predominantly terminal vinyl in structure. When the polymerization is carried out at higher temperatures and in a fixed catalyst bed, the polymer has predominately trans-internal unsaturation. Polymers prepared by both methods are also characterized by their high densities and high percentage of crystallinity at ambient temperatures.

Polymers of ethylene made in accordance with the above-identified patent have a density of 0.930 to 0.980. This so-called high density polymer of ethylene is a very desirable polymer for the body of the cup. A copolymer of this polyolefin with butene-1 is also advantageous as the plastic for the body of the cup.

In density determinations the specimens should be prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

Density is determined by placing a smooth, void-free, pea-sized specimen cut from a compression molded slab of the polymer in a 50-ml., glass-stoppered graduate. Carbon tetrachloride and methylcyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F., the balance is adjusted until the pointer is at zero. The value shown in the scale is taken as the specific gravity. With the balance standardized to reach 1.000 with a sample of distilled water at 4° C. the specific gravity will be numerically equal to density in grams per cc.

The olefins made in accordance with the Hogan and Banks patent, supra, may also be formed by incorporating a suitable foaming agent therein and producing the foamed polymer in conventional manner. However, other foamed plastics are also satisfactory as material for fabrication of the insulating strips.

Various gaseous, liquid, and solid foaming agents are effective in the process of the invention. In general these agents comprise materials which are gaseous at the temperatures of the molten plastic or polymer at atmospheric or lower pressure. Solid materials which decompose at these temperatures and pressures and yield gaseous products or components which react with other ingredients present in the melt to produce gaseous products are applicable. In extruding a plurality of melts, the foaming agent is incorporated in the minor melts. Any inert gas which is non-deleterious to the polymer or plastic being foamed is feasible. Such gases include $N_2$ steam, $CO_2$, ammonia, low-boiling hydrocarbons (propane, butane, pentane), and Freon. Liquids include water and hydrocarbons which vaporize at the extrusion temperatures as pressure outside of the die is released. Solid materials include p,p'-oxy-bis(benzenesulfonyl hydrazide) which is sold under the trade name of "Celogen" by Naugatuck Chemical, a division of the United States Rubber Company; diazoaminobenzene, dinitrosopentamethylenetetramine, 4-nitrobenzene sulfonic acid hydrazide, beta-naphthalene sulfonic acid hydrazide, diphenyl-4,4'-di(sulfonyl azide), and mixtures of materials such as sodium bicarbonate with a solid acid such as tartaric acid.

The amount of foaming agent to be used in the process is in the range of 0.01 to 50 weight percent of the polymer or plastic being extruded. Amounts in the range of 1 to 15 weight percent are preferred.

The temperature employed at the extrusion die varies with the type of plastic or polymer being extruded, it being essential that the molten plastic be at a temperature which facilitates efficient extrusion. The extrusion temperatures of various plastics and polymers are well known in the art. Generally, extrusion temperature will be in the range of about 250 to 600° F. and usually in the range of 350 to 550° F. Extrusion pressures will vary with the type of plastic or polymer and the foaming agent incorporated therein and will range from about atmospheric to as high as 700 or 800 p.s.i.g.

Foamed polystyrene, vinyl polymer and polyurethane are also applicable. It is preferred to use closed cell type foamed polymer so as to avoid excessive absorption of dirt, stains, etc.

Figure 2:
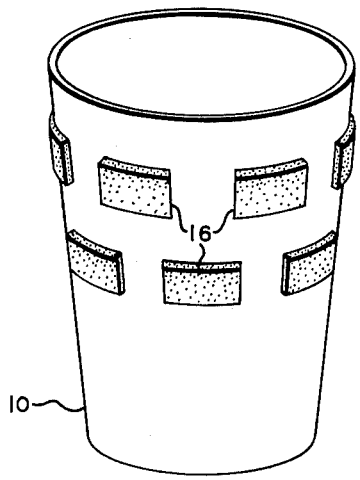
Figure 3:
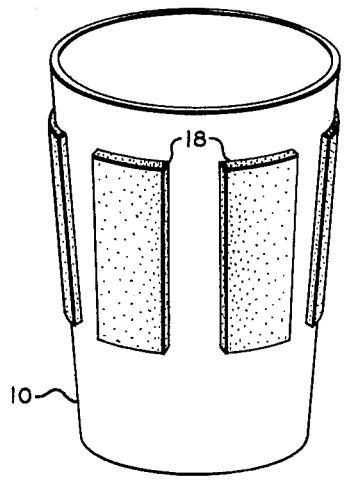
Figure 7:
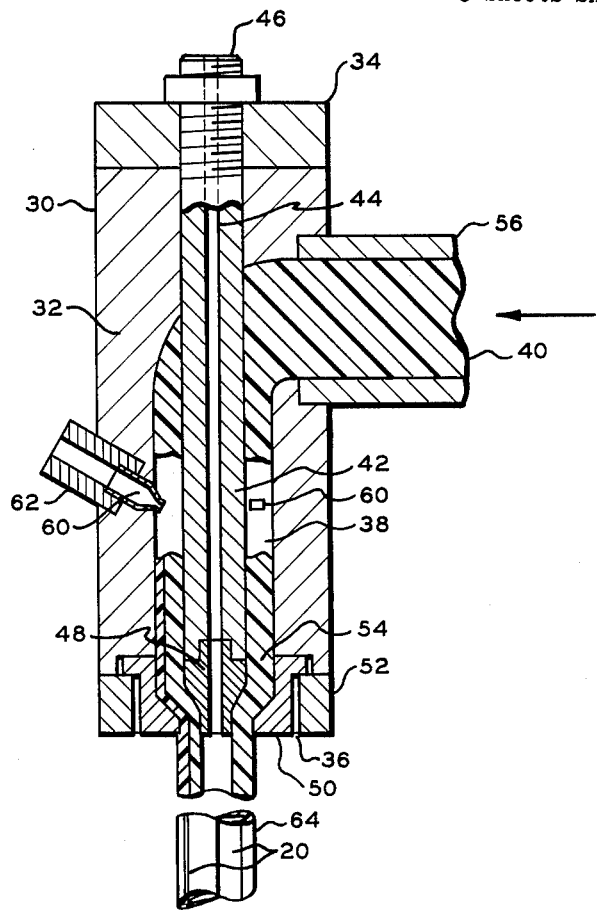
Figure 4:
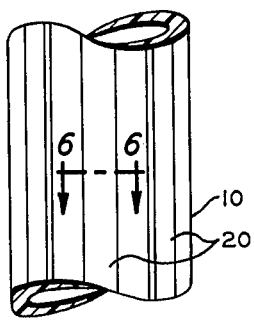
Figure 5:
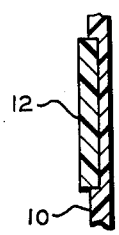
Figure 6:
Figure 9:
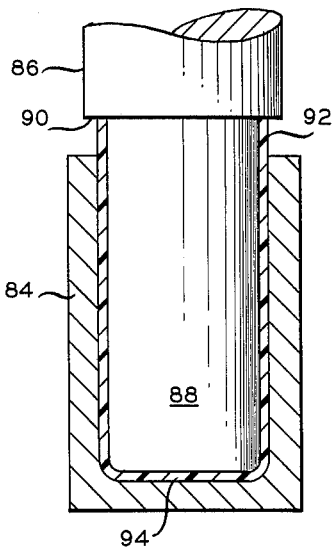
Figure 8:
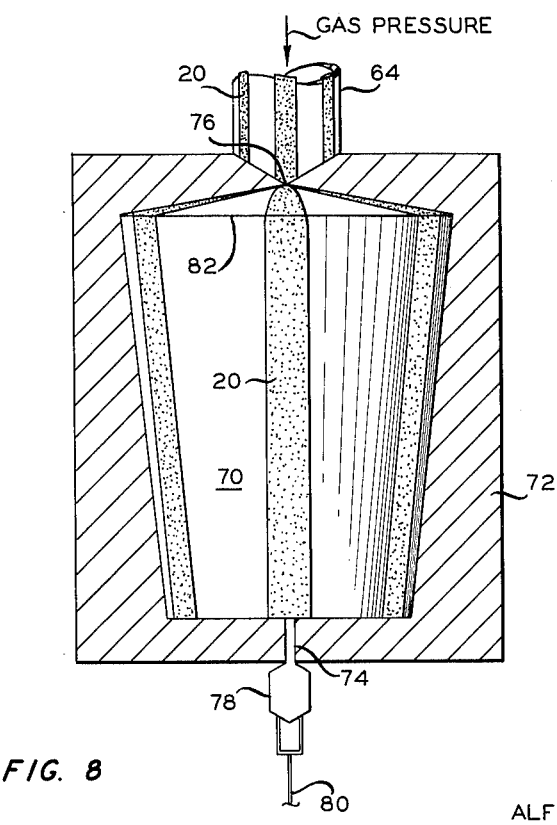

A more complete understanding of the invention may be had by reference to the accompanying schematic drawing of which FIGURES 1, 2 and 3 are pictorial views of cups or containers showing various arrangements of foamed plastic strips on the wall thereof; FIGURE 4 is a pictorial view of a tube or parison made by extruding melts of different colors; FIGURE 5 is a partial section thru the wall of the cup of FIGURE 1 taken on the line 5—5; FIGURE 6 is a horizontal partial section taken on the line 6—6 of FIGURE 4; FIGURE 7 is an elevation in partial cross section of extrusion apparatus for extruding multiple melts in accordance with the invention; FIGURE 8 is an elevation in partial cross section of a mold containing a cup formed from a parison; and FIGURE 9 is an elevation in partial cross section showing a cup in a die formed by heating a section of a parison to form the bottom of the cup.

Referring to FIGURES 1, 2 and 3, a plastic container or cup 10 is formed of unfoamed resin or plastic in conventional manner. In FIGURE 1 the foamed plastic strips comprise circumferential bands 12 and 14 extending around the body of the cup in spaced apart relation. In FIGURE 2 the plastic strips 16 are positioned in horizontal and/or circumferential rows on the body of the cup. Strips 16 may be of any suitable shape such as circular, square, rectangular, trapezoidal, etc. In FIGURE 3 strips 18 are positioned longitudinally on the body of the cup in spaced apart relation to enable the user to handle the cup without making close contact with the body of the cup.

The cup of FIGURE 4 is made by extruding a main melt of unfoamed polymer or plastic and a plurality of minor streams of the melt containing a foaming agent, thru a common die to form a parison from which the cup is blown. This type of cup contains longitudinal strips 20 of foamed material imbedded in the unfoamed plastic body 10 as shown in FIGURE 6.

Strips 12, 16, and 18 are heat-bonded overlays on the body of the cup and stand out therefrom to aid the user in holding the cup with the fingers on the insulated strips while getting the feel of the temperature of the liquid in the cup. Strip 20 of FIGURES 4 and 6 is actually imbedded in the outer wall of the cup body and is only slightly expanded therefrom. The manner of making the cup of FIGURE 4 is discussed more fully in connection with FIGURE 7.

Referring to FIGURE 7, a die head 30 comprises a main body 32, a cap 34, and a die 36. An axial chamber 38 is streamlined into a side inlet 40 of corresponding diameter. An axial tube or mandrel 42 extends thru cap 34 to die 36, providing an air passage 44 extending completely thru the die head. The upper end 46 of the axial tube or mandrel 42 is adapted for attachment to a compressed air supply (not shown). Inner die section 48 threads into the lower end of mandrel 42 while the outer die section 50 is held in position by plate 52. The annulus formed by mandrel 42 and surrounding body 32 is continuous with tapered die annulus 54. A main extruder (not shown) is connected by conduit 56 to the die body. The apparatus thus far described is conventional for tube extrusion applications.

A plurality of extruder nozzles 60 extend obliquely thru the body 32 of the die head for injecting minor melt streams into the side of the tube being extruded. Each tube or nozzle 60 is connected by means of conduit 62 to the outlet of an extruder (not shown). A single extruder with a plurality of delivery conduits 62 may be utilized to supply the several minor melt streams injected thru 60. In applications where different colors in the various strips of foamed resin are desired, separate or individual extruders are used on each of the melt streams.

Foaming agents and color pigments are added to the resin comprising the melt in tubes 60. As the combined melt passes thru tapered annulus 54 and out of the die to form parison 64, the resin in the strips 20 is foamed to produce insulating material on the parison. Tubes 60 are adjustable so that the minor melt in each strip can be injected into the surface of the tube to practically any desired depth. In practice, tubes have been extruded of high density polyethylene containing colored strips or stripes which are embedded in the side of the tube to a depth of ⅔ of the thickness of the tube wall without depositing any of the colored melt all the way thru the wall of the tube, thereby preserving the continuity of the major melt thruout the inner wall of the tube. The colored melt has also been injected deeper in the annulus so that the colored melt extends all the way thru the tube wall. However, this is not desirable in the present application because of the foamed character of the minor melt and the undesirability of this type of melt on the inside of the container.

The parison 64, having strips 20 of insulating plastic or resin imbedded in the walls thereof, is blown into the desired receptacle or container form by enclosing the desired length of parison within two halves of a suitable mold while the parison is in hot state and applying gas pressure thru duct 44 in conventional manner. It is also feasible to cut the parison into suitable lengths for cups and molding same into cups by other methods. Another method comprises extruding the plastic melts into a cylinder of cup diameter and closing the bottom end in any suiable manner to form the cup, while hot or by later heating and shaping. The bottom may be formed over a mold or mandrel.

FIGURE 8 illustrates the formation of a cup 70 by flow molding parison 64 in which are embedded foamed stripes 20. The mold 72 comprises two substantially identical halves which clamp together on the parison directly below the die head shown in FIGURE 7. The pinch-off at 74 is complete to seal the parison at the bottom while that at 76 leaves a small orifice for injection of blowing gas into the parison to force the walls thereof quickly and uniformly outwardly against the die shape to form cup 70. Section 78 is a portion of the parison extending below the pinch-off 74. Finger 80 may be actuated by any suitable means not shown to reach up to receive the lower end of parison 64 and twist same while in heated condition so as to produce helical or spiral stripes before blow molding the cup. After removal of the blown cup form from the mold, it is cut along the line 82 in any suitable manner to open the cup.

FIGURE 9 illustrates one method of forming a bottom on one end of a cylinder tube obtained by cutting the parison into suitable lengths.

The parison may be turned by mechanically grasping the lower end thereof and turning same to produce a uniform twist in the tube before blowing so as to produce diagonal strips or stripes of insulating material on the outside of the cup. The cup may take any suitable shape as determined by the form of the mold. In blow molding of the parison, the cup will have a top thereon which can be machined or trimmed off to provide a smooth edged cup.

A more complete description of the blow molding of the character just described utilizing a main melt and a plurality of minor melts of different color is set forth in copending U.S. application of Branscum and Havely, Serial No. 46,402, filed August 1, 1960, now U.S. Patent 3,097,058.

Resins of different compositions may be utilized in the main melt and in the minor melts, so long as the resins are compatible to form a continuous bonded plastic; however, melts of the same general characteristics except for the addition of the foaming agent and possibly the color pigment are preferred in the two situations.

Certain modifications of the invention will become apparent to those skilled in the art and the illustrative details disclosed are not to be construed as imposing unnecessary limitations on the invention.

I claim:
1. A process for making a plastic cup which comprises simultaneously extruding, in contact, a tube of the unfoamed resin and at least one stripe of a resin containing a foaming agent thru a die to form a striped parison, said foaming agent causing foaming during the extrusion step so as to produce a foamed longitudinal strip heat sealed to the unfoamed wall of said parison; and forming said parison into cup form.

2. The process of claim 1 wherein the main melt and said stripe are of different colors.

3. The process of claim 1 wherein said cup is formed by blow molding said parison.

4. The process of claim 1 including the step of twisting said parison while in soft condition to effect spiral striping before forming said cup.

5. The process of claim 1 wherein said parison is the desired cup diameter and said cup is formed by cutting off a length of said parison and forming one end into a bottom.

References Cited by the Examiner
UNITED STATES PATENTS

| | | | |
|---|---|---|---|
| 2,270,625 | 6/1956 | Colombo | 18—5 |
| 2,904,844 | 9/1959 | Smithies | 264—211 |
| 2,909,810 | 10/1959 | Jensch | 264—211 |
| 2,942,301 | 6/1960 | Price et al. | |
| 3,037,652 | 6/1962 | Wallace | 215—13 |
| 3,127,636 | 4/1964 | Heider | 264—98 |
| 3,145,243 | 8/1964 | Hagen | 264—98 |

ROBERT F. WHITE, *Primary Examiner.*

ALEXANDER H. BRODMERKEL, *Examiner.*

M. H. ROSEN, M. R. DOWLING, *Assistant Examiners.*